(12) United States Patent
Andringa (10) Patent No.: US 8,607,739 B2
(45) Date of Patent: Dec. 17, 2013

(54) LIMITING DEVICE FOR A LYING BOX IN A LOOSE HOUSE

(75) Inventor: Rinse Andringa, Westergeest (NL)

(73) Assignee: R. Andringa Holding B.V., Westergeest (NL)

( * ) Notice: Subject to any disclaimer, the term of this patent is extended or adjusted under 35 U.S.C. 154(b) by 870 days.

(21) Appl. No.: 12/527,674

(22) PCT Filed: Feb. 19, 2008

(86) PCT No.: PCT/NL2008/050094
§ 371 (c)(1),
(2), (4) Date: Oct. 27, 2009

(87) PCT Pub. No.: WO2008/103038
PCT Pub. Date: Aug. 28, 2008

(65) Prior Publication Data
US 2010/0089337 A1    Apr. 15, 2010

(30) Foreign Application Priority Data
Feb. 19, 2007 (NL) .................................. 1033422

(51) Int. Cl.
*A01K 1/00*    (2006.01)
(52) U.S. Cl.
USPC .......................................... 119/525; 119/516
(58) Field of Classification Search
USPC ......... 119/516, 517, 520, 524, 525, 722, 731, 119/733, 736, 742, 744, 840
See application file for complete search history.

(56) References Cited

U.S. PATENT DOCUMENTS

| | | | | |
|---|---|---|---|---|
| 1,560,160 A | * | 11/1925 | Hebert | 119/525 |
| 5,553,569 A | | 9/1996 | Street | |
| 6,470,831 B1 | * | 10/2002 | Taylor | 119/751 |
| 6,935,273 B2 | * | 8/2005 | Throndsen et al. | 119/431 |

FOREIGN PATENT DOCUMENTS

| | | |
|---|---|---|
| DE | 1187418 B | 2/1965 |
| DE | 1800637 A | 7/1969 |
| EP | 0 191 517 A | 8/1986 |
| EP | 0 659 336 B1 | 7/1995 |
| NL | 9302212 A | 7/1995 |

OTHER PUBLICATIONS

International Search Report dated May 23, 2008 for PCT/NL2008/050094.

(Continued)

*Primary Examiner* — Monica Williams
(74) *Attorney, Agent, or Firm* — Leydig, Voit & Mayer, Ltd.

(57) ABSTRACT

A limiting device (9) for limiting the freedom of movement of a standing cow in a lying box (1) in a loose house for keeping cattle, in a direction towards a front end (8) of the lying box. The limiting device (9) is intended to be placed near the front end, on and projecting from the bottom (11) of the lying box. At least one top part (13) of the limiting device is movable between a limiting position operatively projecting from the bottom for limiting the freedom of movement of the standing cow towards the front end of the lying box, and a releasing position, for leaving, for the purpose of the front legs of the cow lying down, at least a part of the space the limiting device occupies in the limiting position. A lying box and a loose house with such limiting device are also described.

13 Claims, 5 Drawing Sheets

(56) References Cited

OTHER PUBLICATIONS

Anderson, N., Ontario Ministry of Agriculture, Dairy Initiatives Newsletter vol. 11, Issue I, Spring 2002 (http://www.ansci.umn.edu/dairy/dinews/11-1-camera.htm): *Candid Camera on Cow Comfort*.
Cook MRCVS, Nigel B., Clinical Assistant Professor in Food Animal Production Medicine, University of Wisconsin—Madison, School of Veterinary Medicine: *Troulbeshooting and Evaluating Cow Comfort and Freestall Design on Dairy Operations*.
Wilson Agriculture Ltd. (http://www.wilsonagri.co.uk/polypillow.htm): *Poly Pillow*.
Anderson, N., Veterinary Science, OMAF, Fergus, Ontario, Jul. 2003: *Cow Behaviour to Judge Free Stalls*.
Palmer, R., Dairy Science Department, University of Wisconsin—Madison: *Cow Comfort Issues in Freestall Barns*.
Promat (http://www.promatltd.com/mainpas.html): *Pasture Mat® The Inside Story*.
Bickert, William G., Agricultural Engineering Department, Michigan State University, East Lansing MI 48824 USA (http://www.wcds.afns.ualberta.ca/proceedings/1999/chap29.htm): *Solving Problems of New Barns and Introducing New Stock: Building and Remodeling Freestall Housing for Cow Comfort*.

\* cited by examiner

LIMITING DEVICE FOR A LYING BOX IN A LOOSE HOUSE

FIELD AND BACKGROUND OF THE INVENTION

In livestock farming, loose houses are used with dunging passages and lying boxes for keeping cows. A lying box is a more or less screened-off space where a cow can lie down to ruminate and rest without being disturbed by other cows walking around in the shed. For milk production, it is important that a cow passes a large part of the day (approximately 10-14 hours a day) lying down. It is further important that the lying surface remains free from excrements, so that the cow does not become soiled with excrements and, in particular, the udders remain clean.

In general, such lying boxes have a rectangular lying surface, geared to the minimum dimensions a cow needs in order to lie or stand comfortably. The cow enters and exits the lying box via an entrance at a rear end of the lying box proximal to the dunging passage. As a rule, the bottom of the lying box is raised relative to the dunging passage that passes along the rear ends of the lying boxes, which dunging passage can be equipped with provisions for discharging excrements. The bottom can be formed from, for instance, hard material, a covering of soft material or loose stable litter or straw.

Gates along the two lengths of the lying box, on the one side, screen the lying box off from, for instance, neighbouring lying boxes or other cows and, furthermore, serve for preventing the cow from standing or lying transversely or askew in the lying box so that upon excretion, the bottom of the lying box would be soiled.

The cows that occupy the lying boxes should preferably, on the one side, stand or lie forward in longitudinal direction so far that the hind legs too stand or rest on the bottom of the lying box. On the other side, the cows should not stand so far forward that, upon excretion, the dung ends up on the bottom of the lying box.

To this end, the lying boxes are customarily provided with a shoulder beam at a height above the floor of the lying box positioned such that the forward freedom of movement of the cow is limited in that the shoulders of the cow contact the shoulder beam when the cow attempts to walk too far forwards over the lying box. Furthermore, lying boxes are sometimes each equipped with a further limiting device on the bottom, for preventing the cows from moving too far forward once they have lied down.

A drawback of a shoulder beam is that it regularly occurs that a cow rises to a standing position that is further forward than the shoulder beam allows. The cow then knocks the shoulder beam from below. This often leads to injuries that may be serious, as serious as breaking of the back, especially when a cow panics due to the wedged-in situation. To prevent forceful contact with the shoulder beam, nylon straps are sometimes used along the shoulder beams. However, becoming wedged-in from below between the strap and the floor may still occur and the nylon strap forms an additional obstacle and, because it can bounce along with the cow, a less accurate limitation than a shoulder beam.

The invention relates to a limiting device according to the introductory portion of claim 1, which, as alternative to the shoulder beam, also serves for limiting, in forward direction, the standing position of the cow and the position from which the cow lies down.

Such a limiting device is known from European patent application 0 659 336. According to a first example, the limiting device is designed as a beam with a height of 15 to 25 cm. Through its location relative to the threshold at the rear end of the lying box, the beam is intended to ensure, in cooperation with a head beam at the front, that after a cow has walked into the lying box, it remains behind the limiting device and will, there, drop to its knees and lie down. According to another example, instead of the beam, a tube is provided, running at a distance above the bottom of the lying box.

A drawback of such a limiting device is that it allows a standing cow to much forward freedom of movement, which leads to the accelerated soiling of the lying box, and/or it leaves a cow lying down too limited a length for lying comfortably in the lying box, which leads to shorter lying times.

SUMMARY OF THE INVENTION

It is an object of the invention to provide a solution with which, without using a shoulder beam at a height such that a cow knocks against it with the shoulder when it attempts to walk forward too much, on the one side, a cow is prevented from standing or lying too far forward in a lying box and, on the other side, sufficient space is offered in longitudinal direction to a cow lying in the lying box, so that a comfortable lying position is allowed.

According to the invention, this object is achieved by a limiting device according to claim 1.

In the limiting position, the limiting device forms an obstacle that reliably prevents forward movement of the standing cow and, in the releasing position, the limiting device leaves sufficient space for a front leg or both front legs of the cow and, hence, for greater total distance in the lying position between the front end of the front legs and the rear end of the cow.

Special embodiments of a limiting device according to the invention and of a lying box and a loose house provided with such limiting devices are laid down in the dependent claims.

Further structural aspects, effects and details of the invention and exemplary embodiments of the invention are described in the following with reference to the drawings.

DETAILED DESCRIPTION

Figure 1:
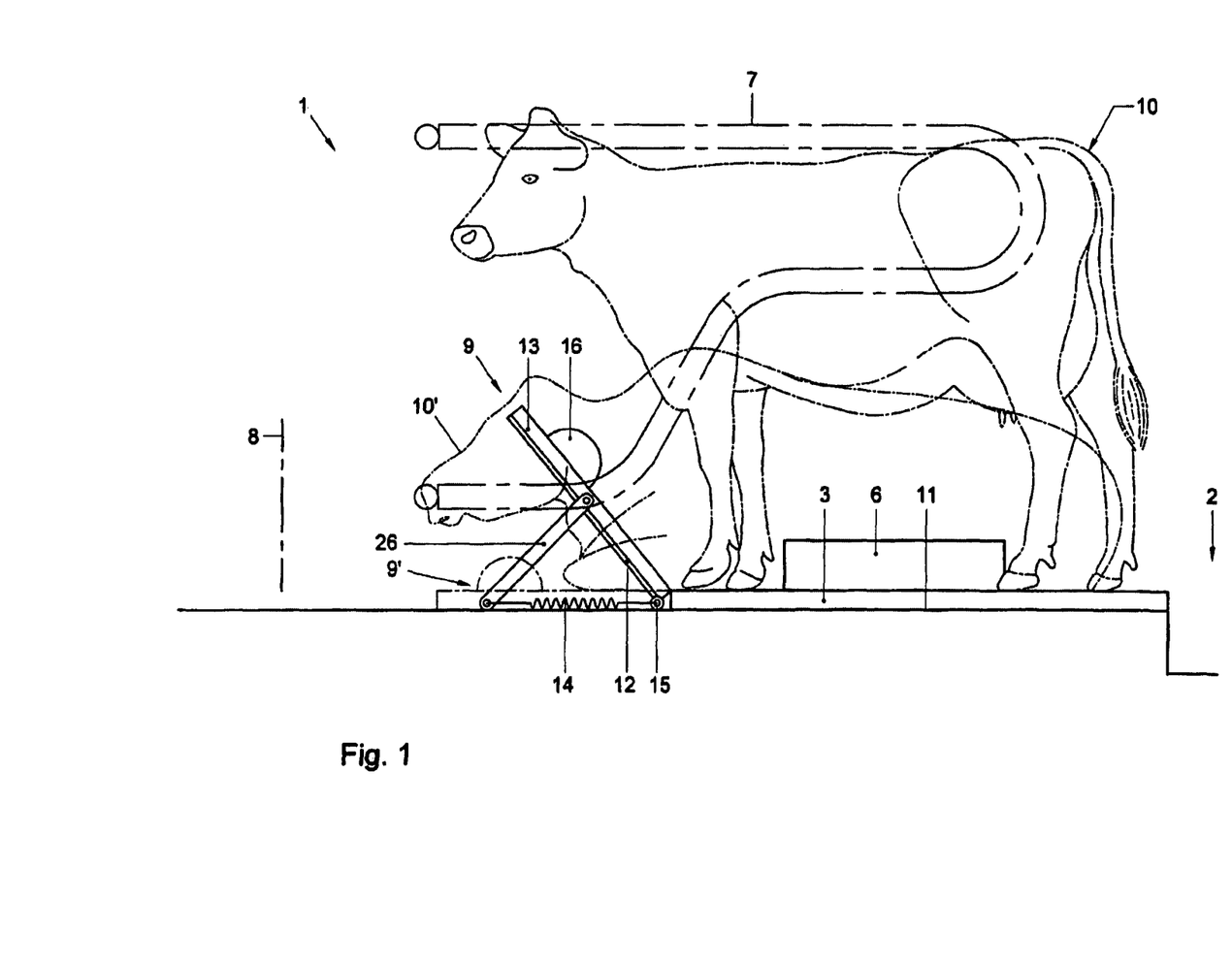
FIG. 1 is a side view in cross-section of a lying box with a cow and a first exemplary embodiment of a limiting device according to the invention.
Figure 2:
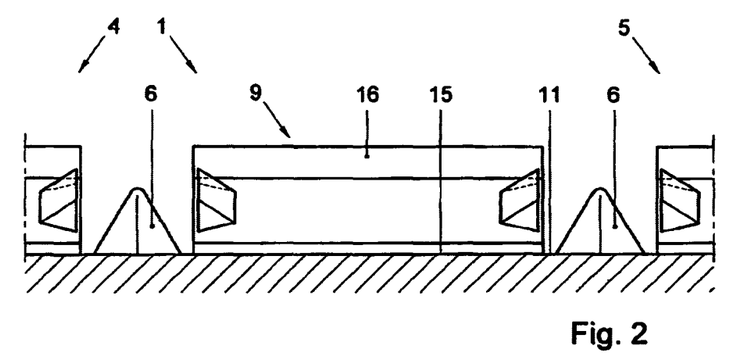
FIG. 2 is a rear view of the lying box according to FIG. 1.

First of all, the invention is elucidated on the basis of the example represented in FIGS. 1 and 2. In FIG. 1, a lying box 1 with adjoining parts of a dunging passage 2 of a loose house is represented. In FIG. 2, the lying box 1 and parts of adjoining lying boxes 4, 5 are represented. Such lying boxes 1, 4, 5 are usually located in the loose house in rows adjacent to each other with their lengths. Here, the lying boxes 1, 4, 5 each have a rear end that is open for allowing a cow into the area of the lying box, and a front end at the end of the lying box remote from the rear end.

As side guides for sideways guiding of cows entering and exiting the lying boxes, side cushions 6 are provided on the bottom between the lying boxes, which are each designed as elevations 6 projecting from the bottom with a narrow top edge and side walls proceeding downwards at an inclination from the top edge to the lying boxes.

In FIG. 1, in dash-dotted lines, a conventional lying box separation 7 is represented which can be provided as alternative or as addition to the side cushions 6. The lying box 1 has a front end indicated in a dash-dotted line 8. In the area of the front end, optionally, further obstacles such as straps and/or beams and/or tubes can be present. In FIG. 1, further, a cow 10 standing in the lying box is represented. In FIG. 1, this cow is also represented in dash-dotted lines in a lying position and indicated with reference numeral 10. The lying box has a bottom 11 with a mattress 3 thereon that forms the underground on which the cow 10 can stand and lie. Instead of a mattress, also, a different underground, such as a matt or sawdust can form a soft lying surface for the cow.

The space above the bottom 11 of the lying box 1 is clear of shoulder beams. Shoulder beams are girders that extend transversely to the lying box at a height (usually approximately 110-130 cm above the bottom of the lying box) that is just slightly lower than the height above the bottom of the shoulders of the cows the lying boxes are intended for, and which prevent a standing cow from moving forward further than a furthest advanced position which is chosen such that, from this position, the cow still excretes precisely into the dunging passage. When a cow lies down, the shoulder beam does not hinder the cow during the forward movement of the shoulders, which forms part of the natural movement pattern of a cow lying down. However, when the cow has moved forward during lying down or when lying down, it knocks its shoulders or back against the shoulder beam when standing up. In particular when the animal panics as a result thereof, this can easily lead to serious injuries.

A limiting device in the form of an obstacle 9 is provided at the front end of the lying box 1, on and projecting from the bottom 11 and the mattress 3 of the lying box 1. With the limiting device 9 according to this example, a top part of the limiting device is designed as a plate 12 with a covering 13 of yielding material thereon, which is movable between a limiting position, projecting from the bottom, represented in FIGS. 1 and 2 in full lines, and a releasing position 9 represented in FIGS. 1 and 2 in dash-dotted lines. The covering 13 is preferably manufactured from the same sort of material as the mattress 3.

In the limiting position, the limiting device 9 limits the standing initial position of the cow 10 in the sense that the freedom of movement of the cow 10 towards the front end 8 of the lying box 1 is limited. This results in that the cow 10 is prevented from standing too far forward and therefore also, that the cow comes to lie in the lying box on a too far forward position. The fact is that standing too far forward and lying too far forward would both lead to soiling of the lying box and, as a result, soiling of the udders. Soiling of the udders increases the risk of contamination of the milk and contraction of disorders such as mastitis.

In the releasing position 9', at least a part of the space occupied by the limiting device 9 in the limiting position is left free so that the cow 10, after it has lied down, has sufficient space available for the front legs. Therefore, sufficient space in longitudinal direction of the lying box is left free for the larger total distance in lying position between the front end of the front legs and the rear end of the cow.

On the limiting device 9, an elevation 16 is provided which can have, for instance, a height of approximately 8-9 cm above the lying surface formed by the top of the mattress, and which serves for preventing the cow lying down from creeping forward too much. Also when a cow, after having lied down, creeps forward too much, the lying box will, in general, become too soiled with manure and the cow can, furthermore, disturb a cow lying in a lying box located opposite the front side. When a wall or other vertical boundary defines the front end, lying too far forward may result in difficulties in rising, because there is insufficient space for moving forward.

In the releasing position, the top part 12, 13 of the limiting device 9 is located lower than in the limiting position, and the limiting device 9 is equipped with an operating assembly, according to this example in the form of a spring 14 and a pivotal support 26, for urging the top part 12, 13 to the limiting position and, when the top part 12, 13 is loaded, for allowing yielding movement of the top part 12, 13 to the releasing position.

When the cow 10 lies down, it pushes the top part 12, 13 with the front legs to the releasing position. As, in the releasing position, the spring 14 and the arm 26 extend virtually parallel to each other, the geometry of the operating assembly 14, 26 is such that the upward force exerted by the top part 12, 13 on the front legs of the cow 10' is relatively limited and considerably smaller than the force required for urging the top part 12, 13 from the limiting position. Therefore, a standing cow 10 will not simply push the limiting device 9 from the limiting position, but, for the cow 10' lying down, it is all the same not uncomfortable to lie on the limiting device 9.

With the limiting device according to this example, the movability of the top part 12, 13 is realized in a simple manner, in that the top part 12, 13 is pivotable about a pivot 15 relative to the bottom 11 on which the limiting device 9 rests.

In the limiting position, a top surface of the top part 12, 13 rises steeply upwards from the bottom 11 to the front end 8 (preferably at an angle>30° relative to the bottom). This contributes to discouraging a standing cow 10 from pushing the limiting device 9 down.

In the releasing position, a part of the top surface located closest to the front end 8 is lower than in the limiting position and the top surface proceeds, relative to the bottom 11, in a flat or at least in a less inclining manner than in the limiting position. In this manner, selectively leaving space for the cow in front of the front legs of the cow lying down is realized in a simple manner.

Figure 3:
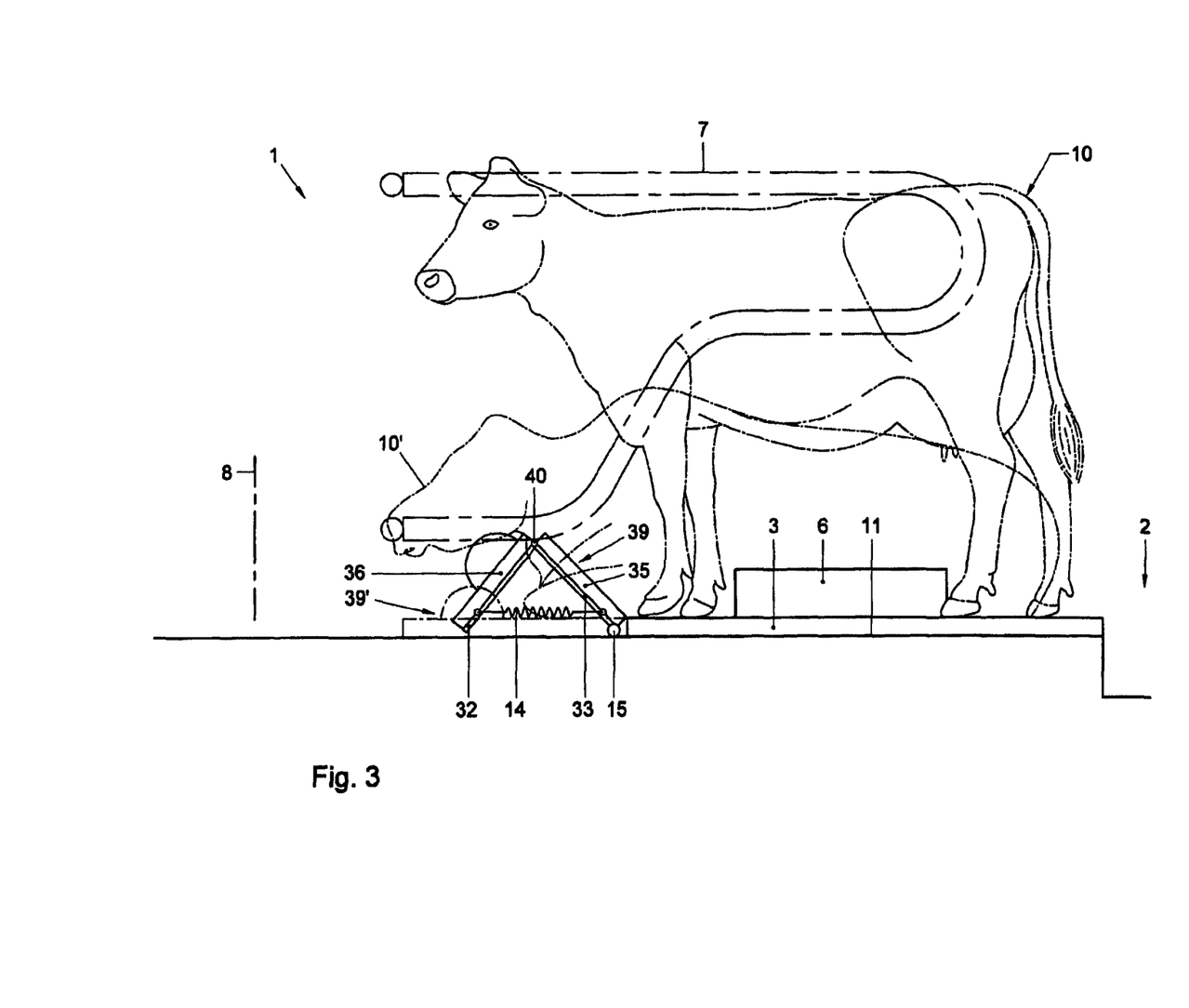
FIG. 3 is a schematic representation in side view of a lying box with a variant on the limiting device according to the exemplary embodiment shown in FIGS. 1 and 2.

In FIG. 3, a variant on the exemplary embodiment of FIGS. 1 and 2 is represented. In this variant, the top part of the limiting device 39 (the limiting device in the releasing position is indicated with reference numeral 39') is sectional and the parts of the plates 32, 33 of the top part are hinged relative to each other about an axis 40. The covering of the plates 32, 33 is accordingly divided into parts 35, 36. The spring 14 is provided between the plate parts 35, 36. Contracting the spring 14, which may also be designed as an elastic band, causes both plate parts to swing out from an extended position along the bottom 11 to an upward-pivoted, limiting position. Here, the plate part 33 near the cow 10 pivots about the axis 15 and the end of the other plate part 32 remote from the plate part 33 near the cow 10 slides over the bottom 11.

Figure 4:
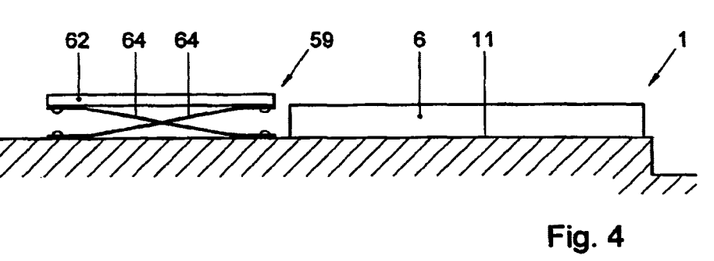
FIG. 4 is a schematic representation in side view of a lying box with a limiting device according to a further exemplary embodiment of the invention in the limiting position.

In FIG. 4, a further example of a limiting device according to the invention is represented, wherein a pair of leaf springs 64 is used as operating element and as attachment element for attaching the top part 62 of the limiting device 59 to the bottom 11. Thus, a simple construction is obtained. Optionally, a single leaf spring can suffice.

It will be clear to the skilled person that within the framework of the invention as laid down in the claims, there are many further embodiments. The fact that in the releasing position, the top part 112 need not be lower than in the limiting position is illustrated with the example represented in FIG. 5. According to this example, the limiting device 109 is equipped with a guide 120 extending along the bottom 11, for guiding movements of the top part 112, as indicated by an arrow 121, over a path between the positions of the top part 112 represented in full lines (the limiting position) and in dash-dotted lines (the releasing position). Further, an operating element in the form of a motor 114 with spindle 122 is provided, for moving the top part 112 back and forth. The motor 114 is coupled to a control unit 123 which, in turn, is coupled to temperature sensors 124 provided on the bottom and with which it can be detected whether a cow lies in the lying box 1.

With the limiting device in the limiting position, the height of the limiting device above the bottom is preferably at least 7 cm and, more particularly, at least 15 cm above the lying surface. More particularly, with the limiting device in the limiting position, the height of the limiting device above the lying surface, is preferably 25-35 cm. Especially if the limiting device has a depth in longitudinal direction of the shed of at least 25 cm, the limiting device can have a relatively small height. This holds the more according as the depth is greater, for instance 30, 40 or 50 cm.

The limiting device in the limiting position is further preferably located at less than 165 cm, and more particularly, at less than 155 cm from the rear end of the lying box. In the releasing position, the limiting device leaves a lying box with, preferably, a length of at least 165 and, more preferably, of 170-190 cm for parts of a cow that are in contact with an underground.

Figure 5:
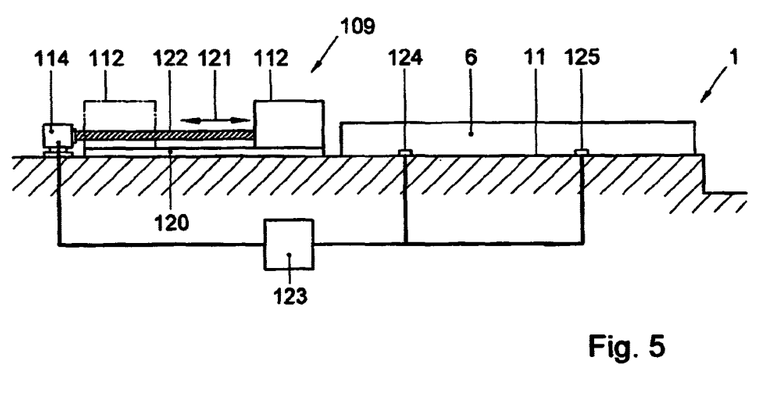
FIG. 5 is a schematic representation in side view of a lying box with a limiting device according to a further exemplary embodiment of the invention.
Figure 6:
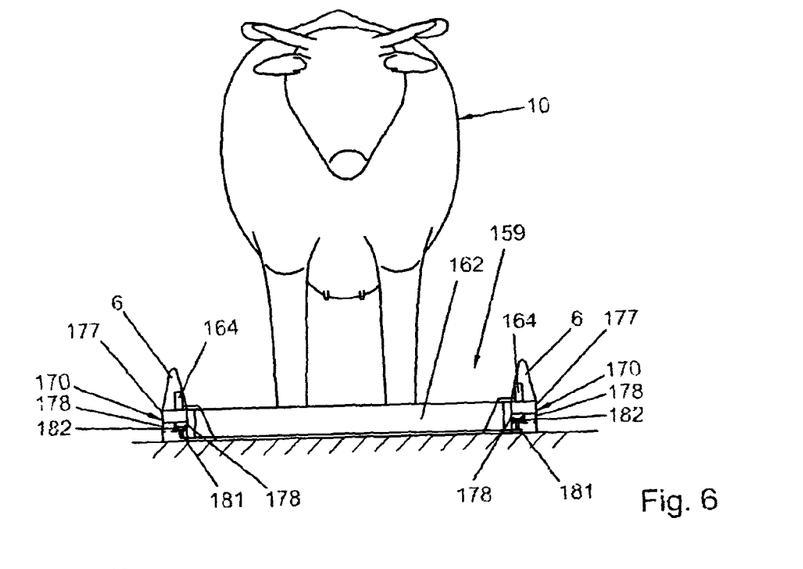
FIG. 6 is a schematic representation in front view of a lying box with a limiting device according to a still further exemplary embodiment of the invention.

In FIGS. 5 and 6, a further example of a lying box with a limiting device according to the invention is represented, wherein the limiting device is movable back and forth in longitudinal direction of the lying box. According to this example too, the limiting device 159 is equipped with guides 170 extending along the bottom 11. According to this example, the top part 162 of the limiting device 159 is designed from metal plate and, guided by the guides 170, movable back and forth between a limiting position 162 represented in full lines in FIG. 7, and a releasing position 162' represented in dash-dotted lines. For urging the top part 162 to the limiting position, the limiting device is equipped with volute springs 164 which are unwound when the top part 162 of the limiting device 159 is moved to the releasing position, in that free ends of the volute springs 164 are attached to the movable top part 162 of the limiting device 159. In wound-up condition, the volute springs 164 are spirally wound leaf springs. Ends of the volute springs 164 located at the inside of the spirals are attached for free rotation about axes perpendicular to the plane of winding. In reaction to being stretched out, the volute springs 164 exert a spring force that varies little with the length over which the volute springs 164 are stretched. The fact is that the winding force is caused by the spring force that urges the strap material to the wound up condition in the area of the transition from the wound part to the part of the strap material stretching in a straight manner. The configuration in the area of the transition varies little to the unwinding of the spring. Thus, the top part is urged to the limiting position with a virtually constant force. This force can be chosen to be sufficiently small to, on the one side, not disturb the animal lying down and having pushed the limiting device 159 away and, on the other side, guarantee a reliable return movement to the limiting position.

Figure 7:
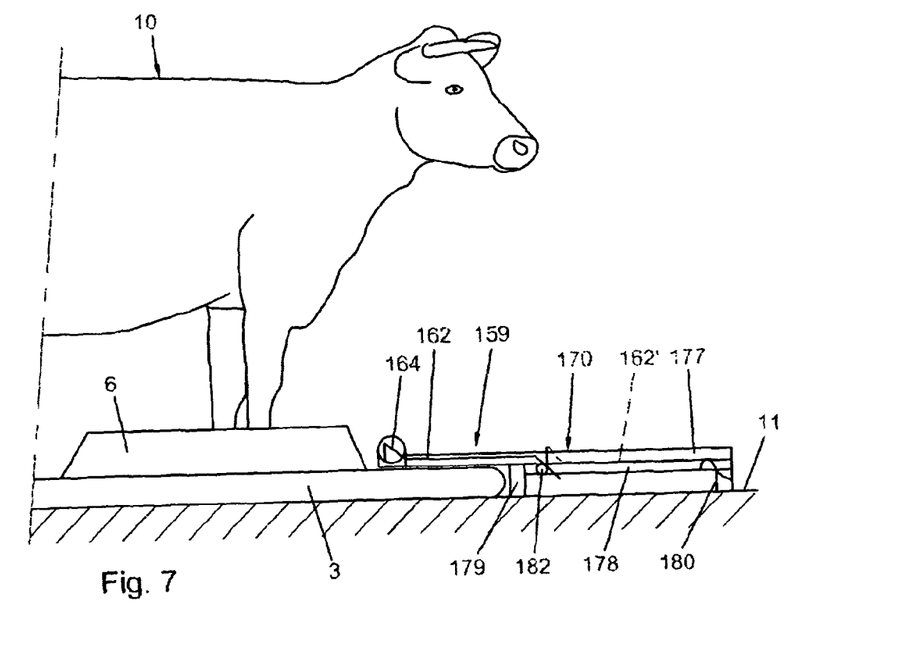
FIG. 7 is a schematic, cutaway representation in side view of a front portion of the lying box according to FIG. 6.

The guides 170 are each composed of an upper profile 177 and two lower profiles 178 and are supported, via supports 179, 180, relative to the bottom 11. The lower profiles 178 each have a slot open towards the bottom in longitudinal direction, through which slot reaches a carrier 181 of the movable top part 162. To this carrier, rollers 182 are attached which can roll back and forth in the slots 178 open only towards the bottom in a reliable manner, screened of from dirt. The rear side of the top part 162 is provided with rollers (not represented) that can unwind over the mattress 3. Optionally, the top part can be provided with an elevation which may be pyramidal, in order to further prevent walking over the limiting device. The rear edge of the top part that, in the releasing position, abuts with limited force against an animal lying down in the lying box, can further be provided with a covering from soft material to prevent further hindrance for an animal in lying position.

Figure 8:
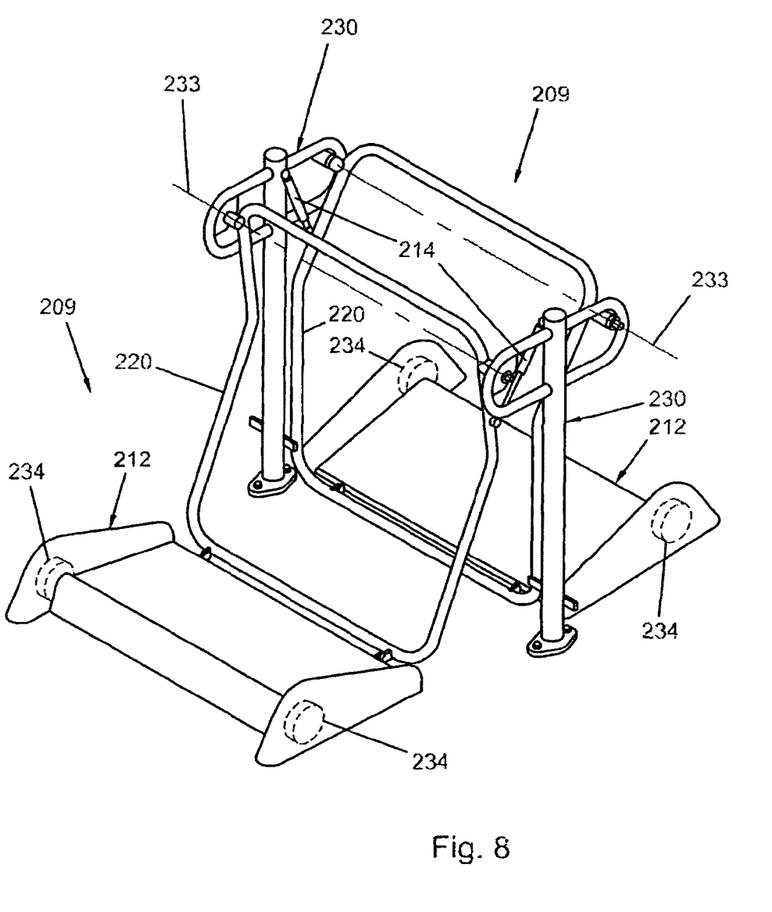
FIG. 8 is a perspective representation of a limiting device according to a further exemplary embodiment of the invention.

With the limiting construction represented in FIG. 8, two limiting devices 209 for lying boxes located with their end faces opposite each other have common supports 230 for supporting guides 220 for guiding the back and forth movement of the top parts 212. The guides are designed as swings 220, pivotable about horizontal axes 233 transversely to the longitudinal direction of the lying box and at a distance above the bottom of the lying box, so that the free end of each of the swings 220, that is hingedly coupled to the top part 212, can be moved back and forth with a substantially horizontal movement component in longitudinal direction of the lying box. For urging the top parts 212 back to the limiting position, operating elements in the form of gas springs 214 are provided between the supports 230 and the swings 220. The top parts are provided, near the sides remote from the swings 220, with rollers 234 which can roll down over the mattress from the lying box.

The invention claimed is:

1. A lying box for a loose house for keeping cattle, the lying box including:
   a rear end that is permanently open to allow a cow into and out of an area of the lying box; and
   a front end at an end of the lying box remote from the rear end, the lying box being provided with side guides for sideways guiding of cows entering and exiting the lying box and, in the area of the front end of the lying box, a limiting device for limiting forward freedom of movement of the cow in the lying box in a direction towards the front end of the lying box, which limiting device is designed as an obstacle placed near the front end, on and projecting from a bottom of the lying box, and at least a top part of the limiting device being pivotably movable between:
      a limiting position, projecting in condition of use from the bottom for limiting freedom of movement of the cow standing in the lying box towards the front end of the lying box, and
      a releasing position, for leaving clear, for the purpose of the front legs of the cow lying down, at least a part of the space the limiting device occupies in the limiting position, and
      wherein the limiting device is configured to move, in response to a cow lying down in the lying box, from the limiting position to the releasing position.

2. The lying box according to claim 1, wherein the top part of the limiting device in the releasing position is located in a lower position than in the limiting position, further comprising an operating element for urging the top part to the limiting position and for allowing, when the top part is loaded, yielding movement of the top part to the releasing position.

3. The lying box according to claim 2, wherein the operating element of the limiting device is designed as at least one spring.

4. The lying box according to claim 3, wherein the at least one spring is designed as at least one leaf spring operatively located below the top part for urging the top part of the limiting device on at least one side to the limiting position at a distance from the bottom.

5. The lying box according to claim 1, wherein the top part of the limiting device, at least in the condition of use, is pivotable about a pivot in a substantially fixed position relative to the bottom on which the limiting device rests, and comprises at least one operating element at a distance from the pivot for maintaining the top part in the limiting position, in which limiting position a top surface of the top part, in condition of use, proceeds upwards to the front end relative to the bottom, and wherein the operating element is designed for at least allowing pivotal movement of the top part to the releasing position, in which a part of the top surface operatively located closest to the front end is lower than in the limiting position and in which the top surface proceeds flatly or at least in a less inclining manner relative to the bottom than in the limiting position.

6. The lying box according to claim 1, a height of the limiting device in the limiting position being at least 7 cm.

7. The lying box according to claim 1, wherein the side guides are designed as elevations projecting from the bottom.

8. The lying box according to claim 1, which is free of a shoulder beam.

9. The lying box according to claim 1, wherein the limiting device in the limiting position is located at less than 165 cm from the rear end of the lying box.

10. A loose house for keeping cattle having dunging passages and lying boxes, the lying boxes each including:
   a rear end that is permanently open to allow a cow into and out of an area of the lying box; and
   a front end at an end of the lying box remote from the rear end, the lying box being provided with side guides for sideways guiding of cows entering and exiting the lying box and, in the area of the front end of the lying box, a limiting device for limiting forward freedom of movement of the cow in the lying box in a direction towards the front end of the lying box, which limiting device is designed as an obstacle placed near the front end, on and projecting from a bottom of the lying box, and at least a top part of the limiting device being pivotably movable between:
   a limiting position, projecting in condition of use from the bottom for limiting freedom of movement of the cow standing in the lying box towards the front end of the lying box, and
   a releasing position, for leaving clear, for the purpose of the front legs of the cow lying down, at least a part of the space the limiting device occupies in the limiting position, and
   wherein the limiting device is configured to move, in response to a cow lying down in the lying box, from the limiting position to the releasing position.

11. A lying box for a loose house for keeping cattle, the lying box being elongate in a longitudinal direction and including:
   a rear end that is permanently open to allow a cow into and out of an area of the lying box; and
   a front end at an end of the lying box remote from the rear end, the lying box being provided with side guides for sideways guiding of cows entering and exiting the lying box and, in the area of the front end of the lying box, a limiting device for limiting forward freedom of movement of the cow in the lying box in a direction towards the front end of the lying box, which limiting device is designed as an obstacle placed near the front end, on and projecting from a bottom of the lying box, and is equipped with guides for guiding movement of at least a top part of the limiting device being movable back and forth in the longitudinal direction of the lying box between:
   a limiting position, projecting in condition of use from the bottom for limiting freedom of movement of the cow standing in the lying box towards the front end of the lying box, and
   a releasing position, for leaving clear, for the purpose of the front legs of the cow lying down, at least a part of the space the limiting device occupies in the limiting position, and
   wherein the limiting device is configured to move, in response to a cow lying down in the lying box, from the limiting position to the releasing position.

12. The lying box according to claim 11, further comprising a guide operatively extending along the bottom for guiding displacement of the top part over a path towards the front end and away from the front end, and at least one operating element for at least urging the top part to a position remote from the front end in said path.

13. A loose house for keeping cattle having dunging passages and lying boxes, the lying boxes each being elongate in a longitudinal direction and each including:
   a rear end that is permanently open to allow a cow into and out of an area of the lying box; and
   a front end at an end of the lying box remote from the rear end, the lying box being provided with side guides for sideways guiding of cows entering and exiting the lying box and, in the area of the front end of the lying box, a limiting device for limiting forward freedom of movement of the cow in the lying box in a direction towards the front end of the lying box, which limiting device is designed as an obstacle placed near the front end, on and projecting from a bottom of the lying box, and is equipped with guides for guiding movement of at least a top part of the limiting device being movable back and forth in the longitudinal direction of the lying box between:
   a limiting position, projecting in condition of use from the bottom for limiting freedom of movement of the cow standing in the lying box towards the front end of the lying box, and
   a releasing position, for leaving clear, for the purpose of the front legs of the cow lying down, at least a part of the space the limiting device occupies in the limiting position, and
   wherein the limiting device is configured to move, in response to a cow lying down in the lying box, from the limiting position to the releasing position.

\* \* \* \* \*

UNITED STATES PATENT AND TRADEMARK OFFICE
CERTIFICATE OF CORRECTION

PATENT NO. : 8,607,739 B2
APPLICATION NO. : 12/527674
DATED : December 17, 2013
INVENTOR(S) : Rinse Andringa It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1048 days.

Signed and Sealed this
Twenty-second Day of September, 2015

Michelle K. Lee
*Director of the United States Patent and Trademark Office*